United States Patent
Kawakami et al.

(10) Patent No.: US 6,880,230 B2
(45) Date of Patent: Apr. 19, 2005

(54) METHOD FOR MANUFACTURING YOKE OF ELECTRIC ROTATING MACHINE

(75) Inventors: Takenobu Kawakami, Toyohashi (JP); Keijirou Suzuki, Kosai (JP); Toshiyuki Kouno, Hamamatsu (JP); Yoshihiro Atsumi, Kosai (JP)

(73) Assignee: ASMO Co., Ltd., Shizuoka-ken (JP)

( * ) Notice: Subject to any disclaimer, the term of this patent is extended or adjusted under 35 U.S.C. 154(b) by 60 days.

(21) Appl. No.: 10/304,549

(22) Filed: Nov. 26, 2002

(65) Prior Publication Data

US 2003/0101570 A1 Jun. 5, 2003

(30) Foreign Application Priority Data

Nov. 27, 2001 (JP) ........................................ 2001-361518
Dec. 18, 2001 (JP) ........................................ 2001-385009

(51) Int. Cl.[7] .................... H02K 15/00; H02K 15/14; H02K 15/16
(52) U.S. Cl. ............................ 29/596; 29/607; 29/732; 310/51; 310/154.08; 384/286
(58) Field of Search .................... 29/596, 607, 732; 310/51, 154.08; 384/286

(56) References Cited

U.S. PATENT DOCUMENTS 4,933,582 A * 6/1990 Hata et al. ............. 310/154.14
5,497,039 A * 3/1996 Blaettner et al. ............. 310/51

FOREIGN PATENT DOCUMENTS

| GB | 1118604 | 7/1968 | ............ H02K/1/18 |
| JP | 04275837 | 10/1992 | ........... B23P/19/02 |
| JP | 05-15646 | 2/1993 | ............ H02K/1/17 |
| JP | 05-161285 | 6/1993 | ............ H02K/1/17 |
| JP | 2001045720 | 2/2001 | .......... H02K/15/03 |
| JP | 2001-045720 | * 2/2001 | .......... H02K/15/03 |

* cited by examiner

Primary Examiner—Carl J. Arbes
Assistant Examiner—Tim Phan
(74) Attorney, Agent, or Firm—Marsh Fischmann & Breyfogle LLP

(57) ABSTRACT

A yoke in a motor includes a cylindrical yoke housing having a closed end and two magnets that is located in the yoke housing. The magnets are fixed to the yoke housing with adhesive. The adhesive is applied a at least to each adhering area of the yoke housing that is to be adhered to the corresponding magnet or to an adhering area of the each magnet that is to be adhered to the yoke housing. The adhesive is spread to the adhering areas of the yoke housing and each magnet by sliding the adhering areas on each other. Therefore, the magnets are firmly fixed to the yoke housing with a small amount of adhesive.

12 Claims, 21 Drawing Sheets

Fig.21 (a)
Fig.21 (b)
Fig.21 (c)
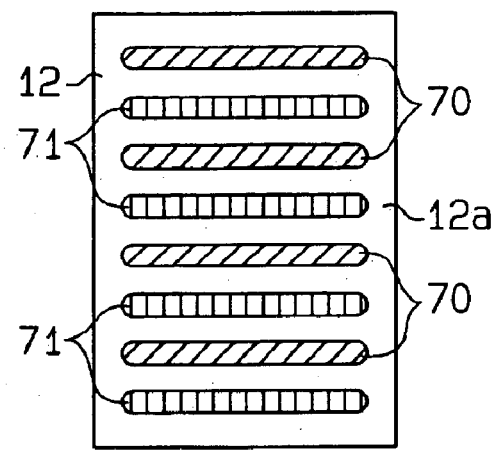
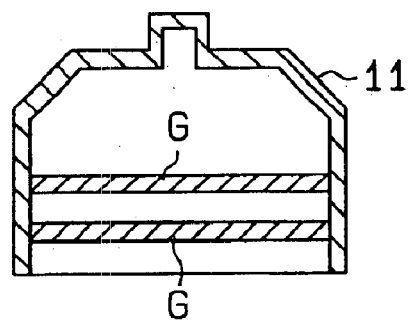
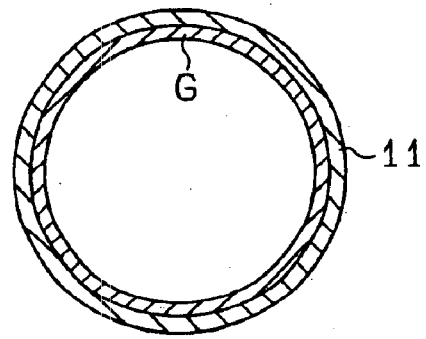
Fig.22
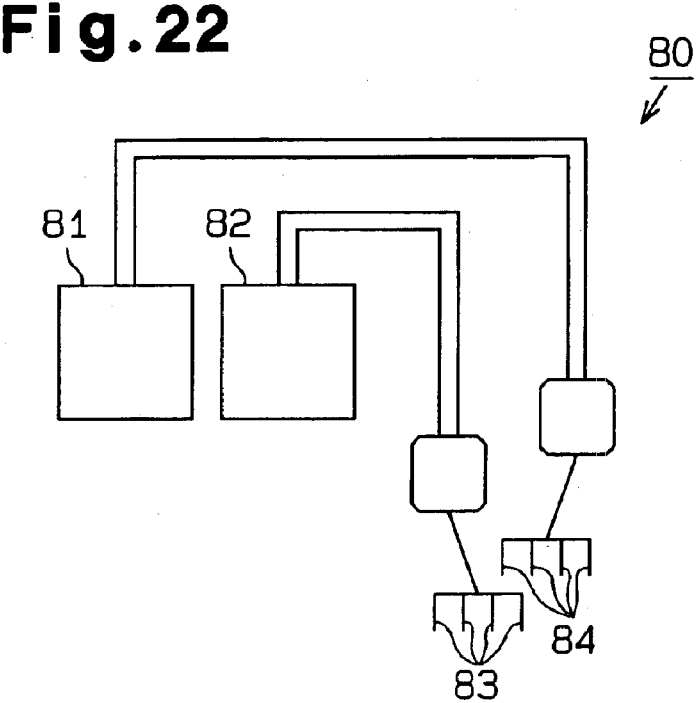

METHOD FOR MANUFACTURING YOKE OF ELECTRIC ROTATING MACHINE

CROSS REFERENCE TO RELATED DOCUMENT

This application claims the benefit of Japanese Patent Applications No. 2001-361518, filed on Nov. 27, 2001 and No. 2001-385009, filed on Dec. 18, 2001.

BACKGROUND OF THE INVENTION

The present invention relates to a method and apparatus for manufacturing a yoke in an electric rotating machine such as a motor.

The yoke of an electric rotating machine is manufactured by fixing magnets on the inner surface of a yoke housing with adhesive. The yoke housing also functions as the housing of the machine. Specifically, as shown in FIG. 23, adhesive 100 is applied to the sides of magnets 101. Then, the magnets 101 are pressed against the inner surface of a yoke housing 102, and the adhesive 100 is cured. To firmly fix the magnets 101 to the yoke housing 102, the adhesive 100 is generally applied to the sides of the magnets 101 in stripes. However, by simply pressing the magnets 101 against the inner surface of the yoke housing 102, the adhesive 100 cannot be easily spread to the entire adhering areas of the magnets 101 and the yoke housing 102. Therefore, an amount of the adhesive 100 that is greater than necessary is applied to the magnets 101 so that the adhesive 100 is spread to the entire adhering areas. However, a great amount of the adhesive 100 extends the curing time of the adhesive 100 and increases the cost. In addition, excessive amount of the adhesive 100 will be squeezed out of the adhering areas of the magnets 101 and the yoke housing 102.

SUMMARY OF THE INVENTION

Accordingly, it is an objective of the present invention to provide a method and apparatus for manufacturing a yoke of an electric rotating machine, which firmly fix a magnet to a yoke member with a small amount of adhesive.

To achieve the foregoing and other objectives and in accordance with the purposes of the present invention, a method for manufacturing a yoke used in an electric rotating machine is provided. The yoke includes a yoke member and a magnet that is fixed to the yoke member with adhesive. The method includes: applying adhesive at least to an adhering area of the yoke member that is to be adhered to the magnet or to an adhering area of the magnet that is to be adhered to the yoke member; and spreading the adhesive to the adhering areas of the yoke member and the magnet by sliding the adhering areas on each other.

The present invention provides another method for manufacturing a yoke used in an electric rotating machine. The yoke includes a cylindrical yoke member having a closed end and a magnet that is located in the yoke member and is fixed to the yoke member with adhesive. The method includes: applying adhesive at least to an adhering area of the yoke member that is to be adhered to the magnet or to an adhering area of the magnet that is to be adhered to the yoke member; attaching the magnet to a jig; covering the magnet attached to the jig with the yoke member; and spreading the adhesive to the adhering areas of the yoke member and the magnet by moving one of the yoke member and the magnet relative to the other.

The present invention provides a further method for manufacturing a yoke used in an electric rotating machine. The yoke includes a cylindrical yoke member having a closed end and a magnet that is located in the yoke member and is fixed to the yoke member. The method includes: forming a projection and a retreat portion in the yoke member; covering the magnet with the yoke member while holding the magnet with a holding member; and fixing the magnet to the yoke member with adhesive while causing the magnet held by the holding member to contact the projection, wherein, when the magnet contacts the projection, the holding member is located in the retreat portion.

The present invention provides yet another method for manufacturing a yoke used in an electric rotating machine. The yoke includes a cylindrical yoke member having a closed end and a magnet that is located in the yoke member and is fixed to the yoke member with adhesive. The method includes: forming a projection and a retreat portion in the yoke member; attaching the magnet to the jig, wherein the jig holds the magnet with a holding member in the axial direction; sliding the yoke member and the magnet on each other while pressing the magnet held by the holding member against the inner surface of the yoke member with the adhesive in between; determining the position of the magnet held by the holding member by causing the magnet to contact the projection, wherein, when the magnet contacts the projection, the holding member is located in the retreat portion; and releasing the magnet from the holding member after the adhesive is cured.

In another aspect of the present invention, a jig for manufacturing a yoke used in an electric rotating machine is provided. The yoke includes a yoke member and a pair of magnets that are fixed to the yoke member with adhesive. The jig includes a receiving member for detachably supporting the magnets such that adhering areas of the magnets that are to be adhered to the yoke member face the opposite directions.

In a further aspect of the present invention, an apparatus for manufacturing a yoke used in an electric rotating machine is provided. The yoke includes a cylindrical yoke member having a closed end and a magnet that is located in the yoke member arid is fixed to the yoke member with adhesive. The apparatus includes an application device, a jig and a sliding device. The application device applies adhesive at least to an adhering area of the yoke member that is to be adhered to the magnet or to an adhering area of the magnet that is to be adhered to the yoke member. The jig detachably supports the magnet. The sliding device moves one of the yoke member and the magnet relative to the other, thereby spreading the adhesive to the adhering areas of the yoke member and the magnet.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 21(a) is a front view illustrating a magnet to which adhesive is applied in a method according to another embodiment of the present invention;

FIG. 21(b) is a cross-sectional front view illustrating a yoke housing to which adhesive is applied in a method according to a further embodiment of the present invention;

FIG. 21(c) is a cross-sectional plan view of the yoke housing shown in FIG. 21(b);

FIG. 22 is a diagram showing an adhesive application device according to another embodiment of the present invention.

DETAILED DESCRIPTION OF THE PREFERRED EMBODIMENTS

One embodiment of the present invention will now be described with reference to FIGS. 1 to 20.

Figure 2:
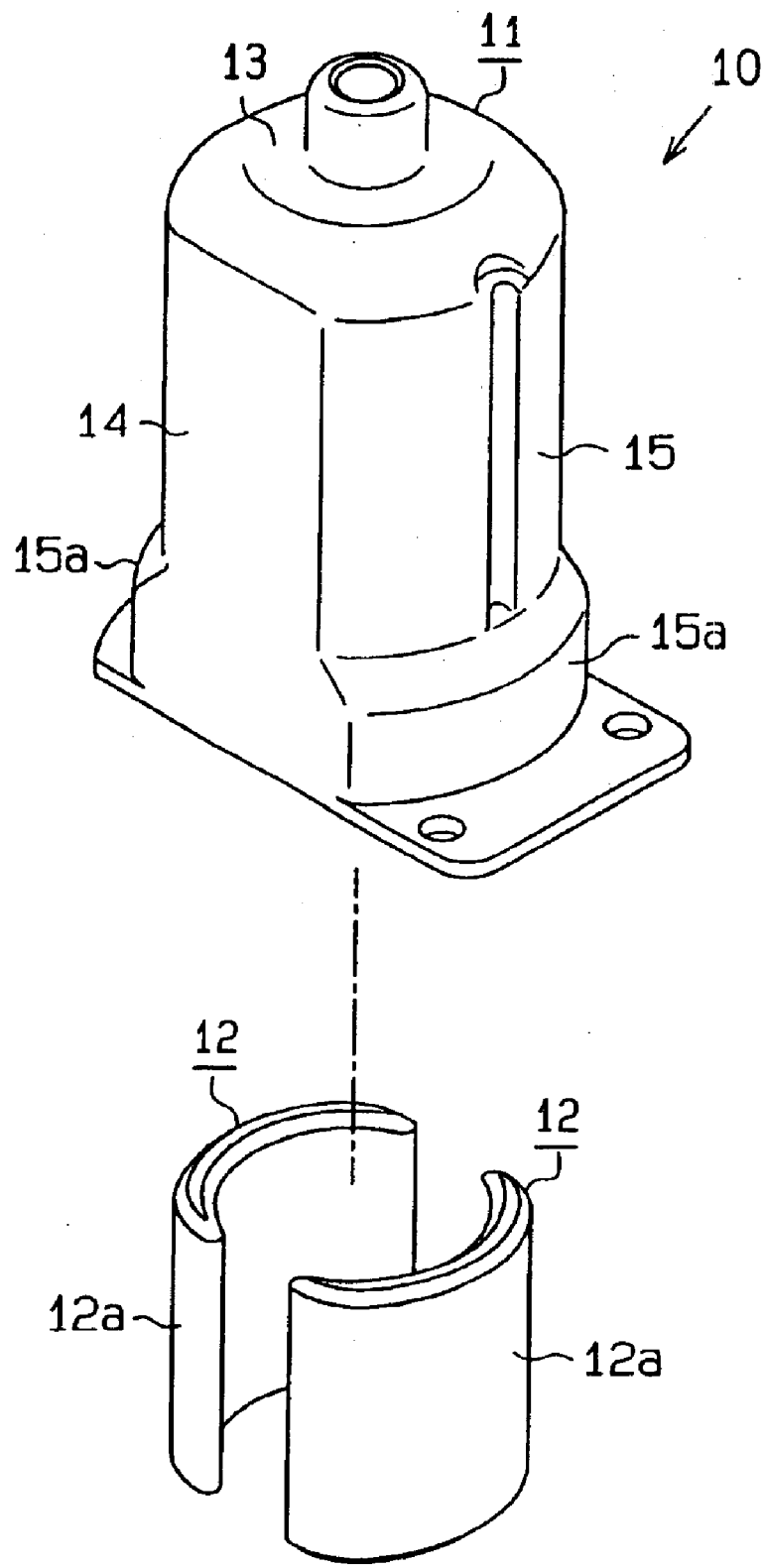
FIG. 2 is an exploded perspective view illustrating the yoke of the embodiment of FIG. 1.
Figure 3A:
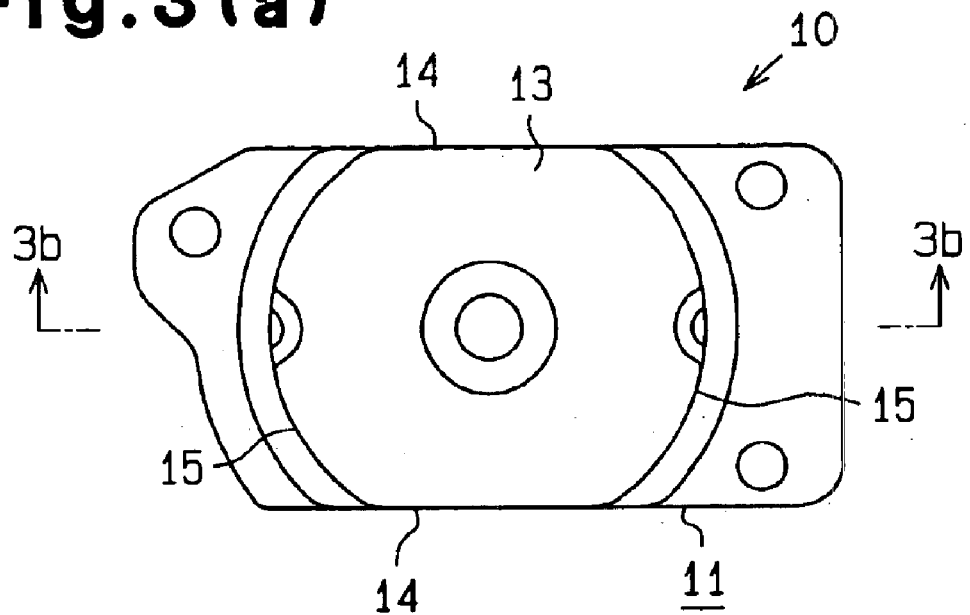
FIG. 3(a) is a plan view of the yoke shown in FIG. 2.
Figure 3B:
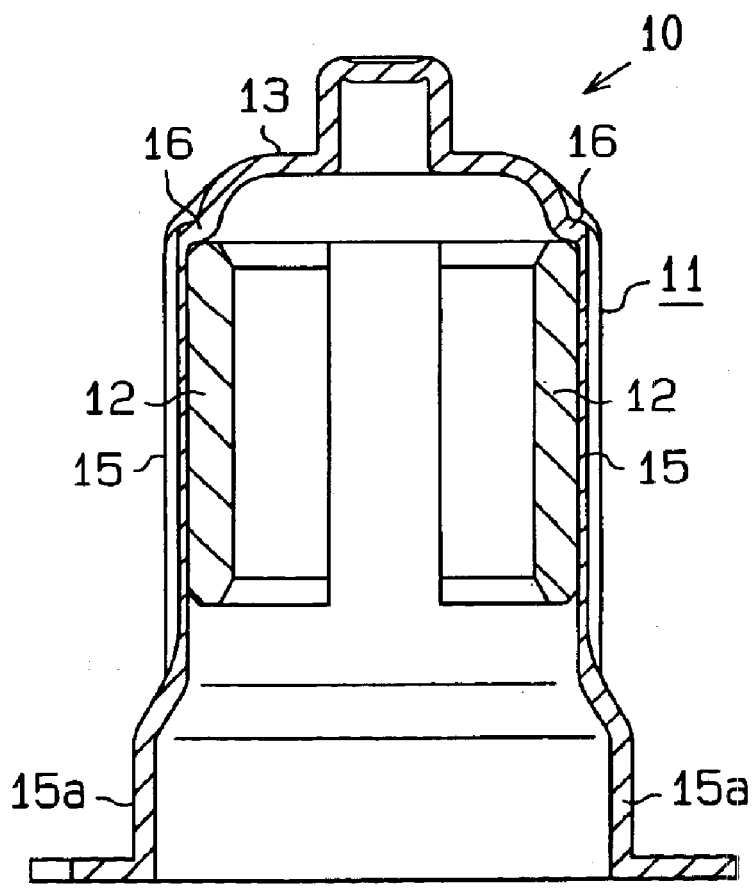
FIG. 3(b) is a cross-sectional view taken along line 3b—3b of FIG. 3(a)

An electric rotating machine, which is a direct-current motor in this embodiment, has a yoke 10. First, the yoke 10 will be described. As shown in FIGS. 2 to 3(b), the yoke 10 includes a yoke member and a pair of magnets (field magnets) 12. In this embodiment, the yoke member is a yoke housing 11.

The yoke housing 11 also functions as the casing of the direct-current motor. The yoke housing 11 is shaped as a cup and has a bottom portion 13, two facing flat portions 14 extending from the rim of the bottom portion 13, and two facing arcuate portions 15 also extending from the rim of the bottom portion 13. The flat portions 14 and the arcuate portions 15 are adjacent to each other. A projection 16 projecting inward of the yoke housing 11 is formed at the boundary between the bottom portion 13 and each arcuate portion 15. Each projection 16 is located at the circumferential center of the corresponding arcuate portion 15. In other words, retreat portions are formed on the sides of each projection 16 in the boundary between the bottom portion 13 and the corresponding arcuate portion 15 (see FIG. 14). In this embodiment, the retreat portion is a recess 17. The space between the arcuate portions 15 is widened at the opening of the yoke housing 11. Specifically, a widened portion 15a is formed at a part of each arcuate portion 15 that forms the opening of the yoke housing 11.

Each magnet 12 is secured to the inner surface of the corresponding arcuate portion 15. The magnets 12 have a substantially arcuate cross-section. The radius of curvature of the outer surface 12a of each magnet 12 is equal to the radius of curvature of the inner surface of each arcuate portion 15. The circumferential center of an axial end (upper end as viewed in FIG. 3(b)) of each magnet 12 contacts the corresponding projection 16 (see FIG. 3(b)).

Other than the yoke 10, the direct-current motor includes an armature, a commutator, and a brush mechanism (none of which are shown). The armature includes a rotary shaft and an excitation coil.

Next, a jig 20 used for fixing the magnets to the yoke housing 11 will be described. The yoke housing 11 and the magnets 12 are attached to the jig 20. As shown in FIGS. 6 to 9, the jig 20 has a base 21 and a pair of moving members 22. A vertical through hole 23 and two horizontal holes 24 communicating with the vertical through hole 23 are formed in the base 21. The horizontal holes 24 are coaxial. The moving members 22 extend upward from the vertical through hole 23. The lower portion of each moving member 22 is fitted in the vertical through hole 23. Also, the lower end of each moving member 22 is bent horizontally and fitted in the corresponding horizontal hole 24. Two rollers 25 are housed in the vertical through hole 23. The rollers 25 extend perpendicular to a direction along which the horizontal holes 24 extend. The rollers 25 are movable in a direction along which the horizontal holes 24 extend. Each roller 25 is coupled to one of the moving members 22. Each moving member 22 moves horizontally along the corresponding horizontal hole 24 as the corresponding roller 25 moves. That is, when the rollers 25 approach each other, the moving members 22 approach each other. When the rollers 25 move away from each other, the moving members 22 move away from each other. An urging member, which is compression spring 26 in this embodiment, is accommodated in each horizontal hole 24. Each compression spring 26 urges the corresponding moving member 22 away from the other moving member 22. A pair of stoppers 27 extend upward from parts of the upper surface of the base 21 that correspond to the rim of the vertical through hole 23. The stoppers 27 are arranged in a direction along which the horizontal holes 24 extend. When the yoke housing 11 is attached to the jig 20, the stoppers 27 are fitted in the widened portions 15a of the yoke housing 11.

A receiving member 28 formed at a part of each moving member 22 that extends upward from the base 21. The magnets 12 are each attached to one of the receiving members 28. The receiving members 28 are arranged in a direction along which the horizontal holes 24 extend. When the magnets 12 are attached to the receiving members 28, the outer surfaces 12a of the magnets 12 face the opposite directions. A part of each receiving member 28 that faces the inner surface of the corresponding magnet 12 is formed arcuate. The radius of curvature of the arcuate portion of each receiving member 28 is substantially equal to the radius of curvature of the inner surface of the corresponding magnet 12. Each receiving member 28 has holding members. In this embodiment, the holding members include four engaging pieces 29, a stopping member 30, and a pair of claws 31, The engaging pieces 29 engage with the sides of the magnets 12 attached to the receiving member 28 to prevent the magnet 12 from moving in its circumferential direction. The stopping member 30 engages with the lower end of the magnet 12 to prevent the magnet 12 from moving downward. The claws 31 engage with the circumferential ends of the upper end of the magnet 12 to prevent the magnet 12 from moving upward. The claws 31 are moved between engage positions, at which the claws 31 engage with the circumferential ends of the upper end of the magnet 12 attached to the receiving member 28, and disengage positions, at which the claws 31 do not engage with the magnet 12. The disengage positions are located above the engage positions. The pair of the claws 31 are urged downward by a tension spring 32. A knob 33 is located at the upper end of each moving member 22. When one of the knobs 33 is lifted, the corresponding pair of the claws 31 are moved upward.

Figure 10:
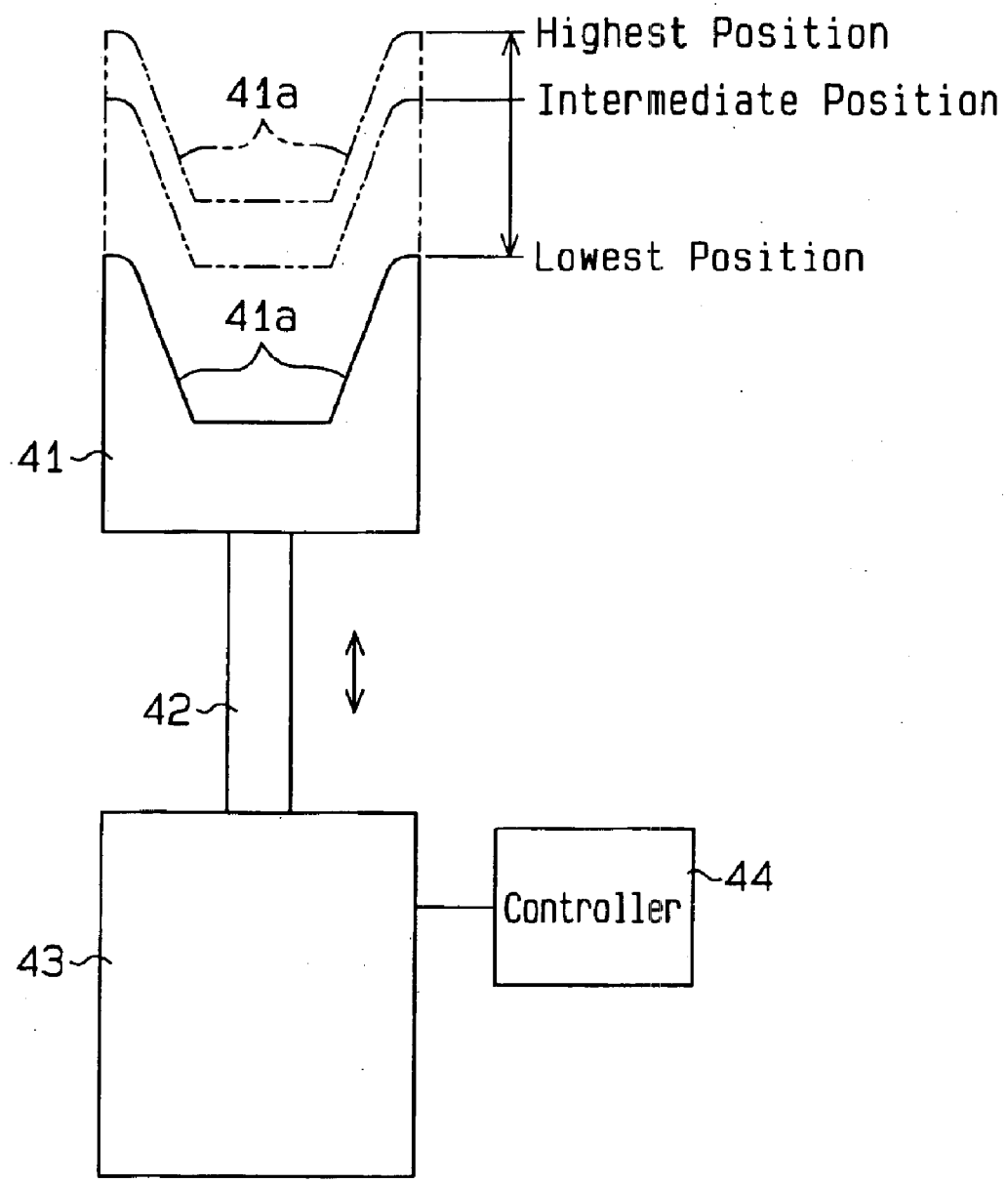
FIG. 10 is a schematic view showing the actuator of the jig shown in FIG. 6.

The jig 20 further includes an actuator 40 for moving the moving members 22 (see FIG. 10). The actuator 40 includes an operational member 41, a rod 42, a servomotor 43, and a controller 44. The operational member 41 has two tapered operational surfaces 41a facing each other. The operational member 41 is coupled to the servomotor 43 with the rod 42. The servomotor 43 drives the operational member 41 to move the operational member 41 between a highest position and a lowest position. The controller 44 controls the movement of the operational member 41 with the servomotor 43. As the operational member 41 moves, the operational surfaces 41a contact and separate from the rollers 25.

Figure 9:
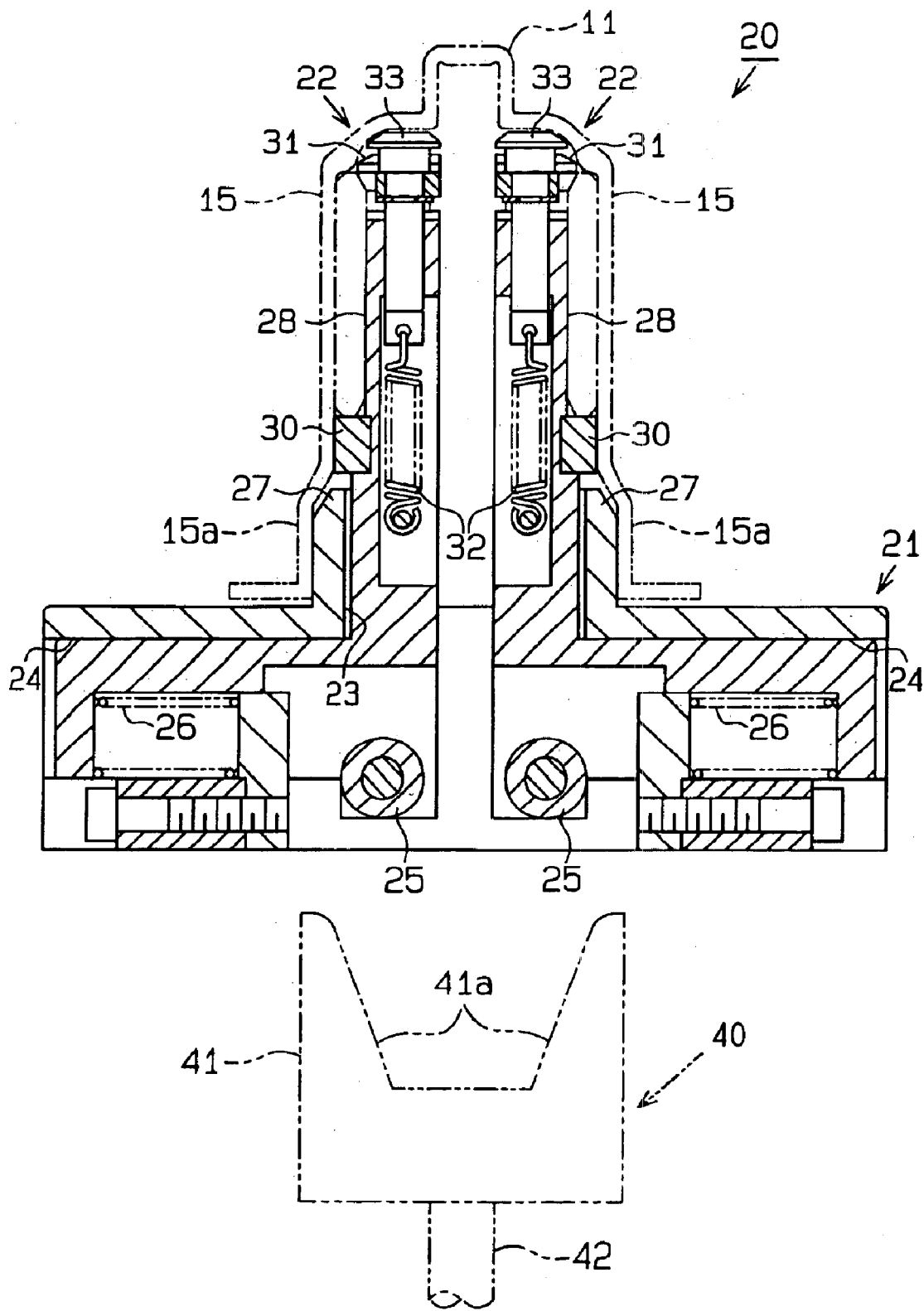
FIG. 9 is a cross-sectional front view showing the jig of FIG. 6.

When the operational member 41 is moved to the lowest position, which is shown by broken lines in FIG. 9, the operational surfaces 41a do not contact the rollers 25. Therefore, the moving members 22 are urged by the compression springs 26 and are away from each other by the widest space. When the operational member 41 is moved to the highest position shown in FIG. 11, the operational surfaces 41a causes the rollers 25 to be closest each other. Therefore, the moving members 22 are closest to each other. When the operational member 41 is moved to an intermediate position shown in FIG. 15, the operational surfaces 41a places the rollers 25 at intermediate positions, which are between the farthest positions and the closest positions. Therefore, the moving members 22 are at intermediate positions, which are between the farthest positions and the closest positions.

The moving members 22, the compression springs 26, and the actuator 40 form an approach mechanism in this embodiment. The approach mechanism causes the magnets 12 supported by the receiving members 28 to approach and separate from each other.

Figure 1:
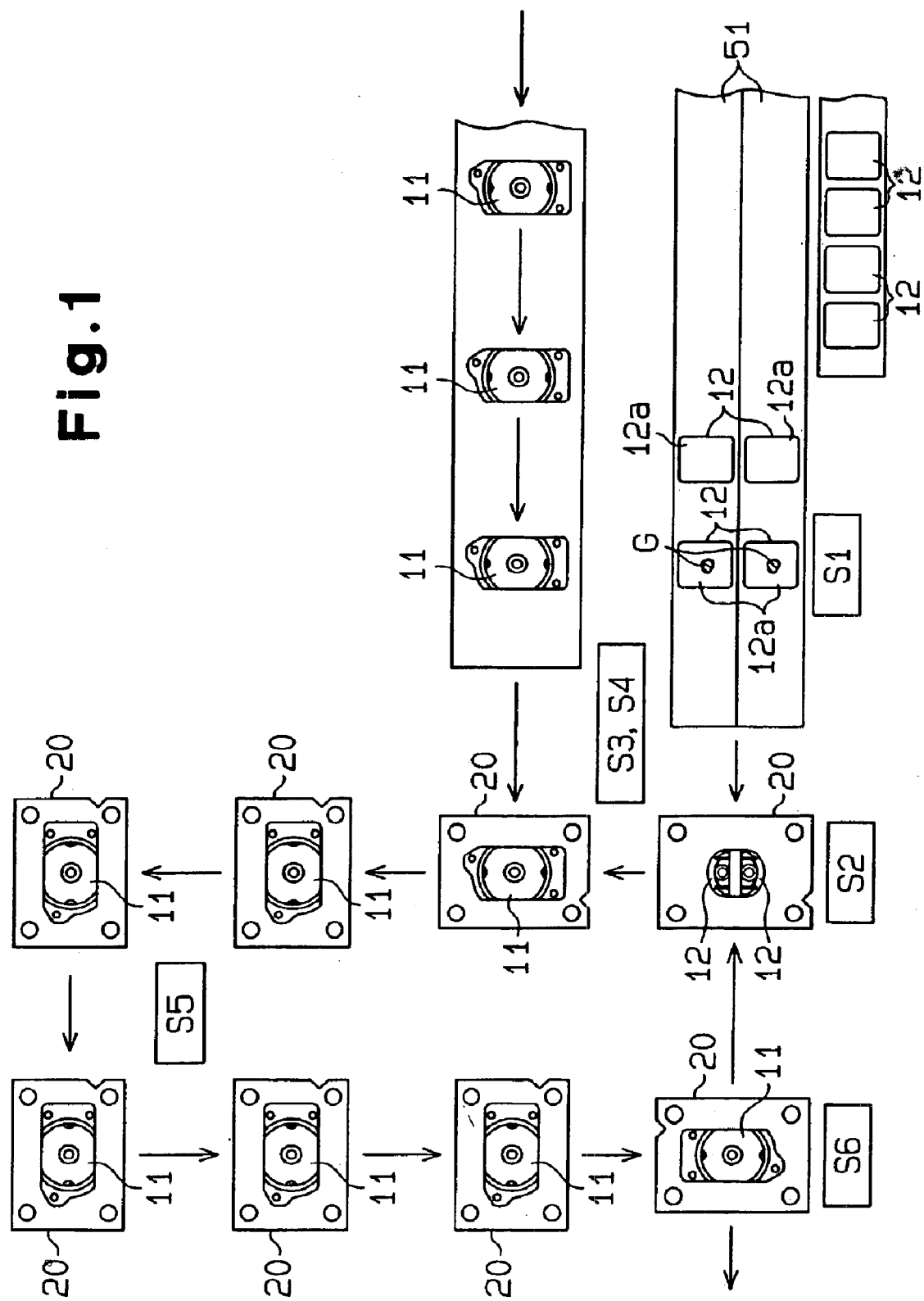
FIG. 1 is a diagrammatic plan view showing a method for manufacturing a yoke according to one embodiment of the present invention.

The method for manufacturing the yoke 10 will now be described. As shown in FIG. 1, a method for manufacturing the yoke 10 includes first to sixth steps S1 to S6. The first to sixth steps S1 to S6 will now be described one by one.

(First Step S1)

Figure 5:
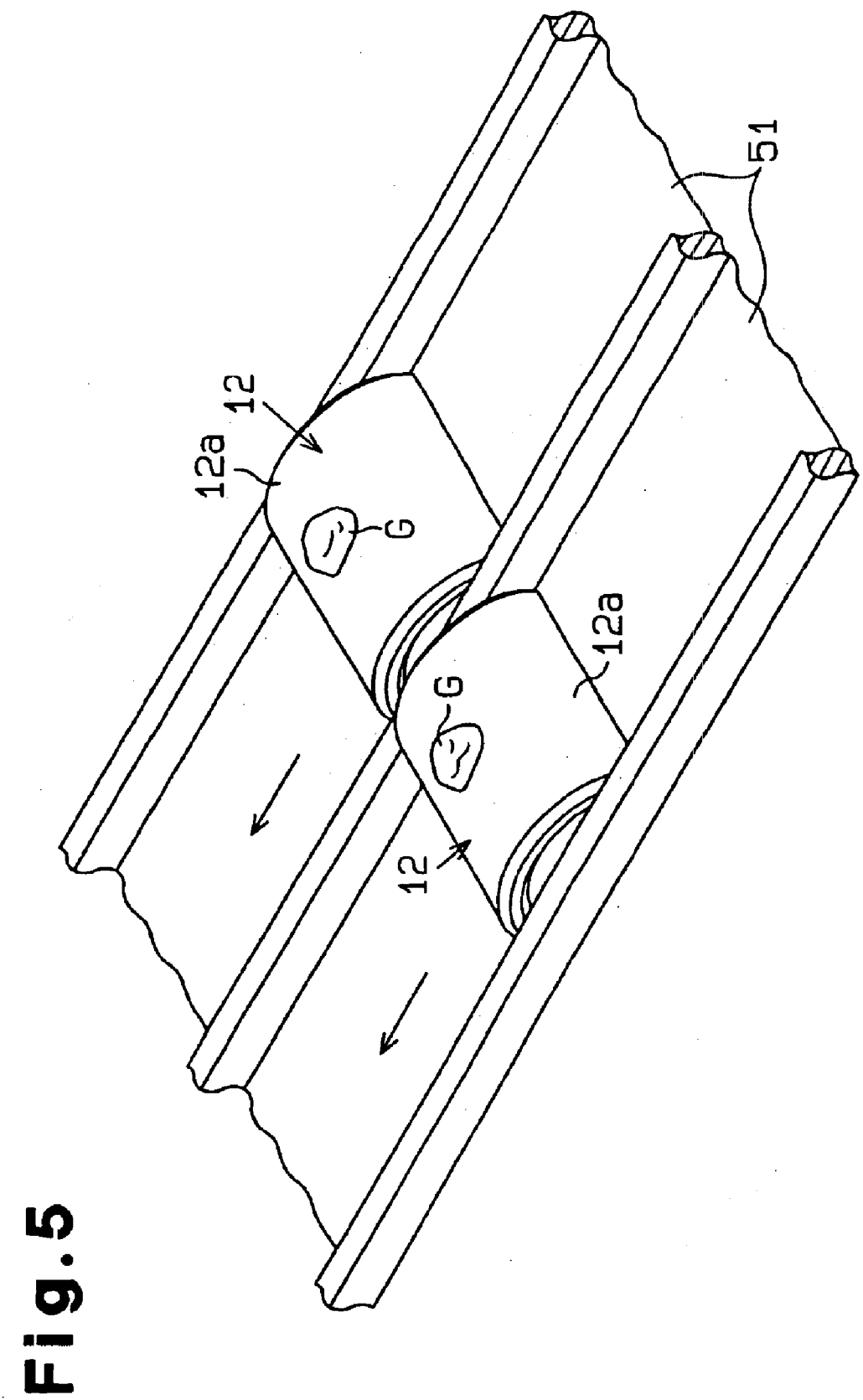
FIG. 5 is a perspective view showing magnets on which adhesive has been applied in the first step.
Figure 6:
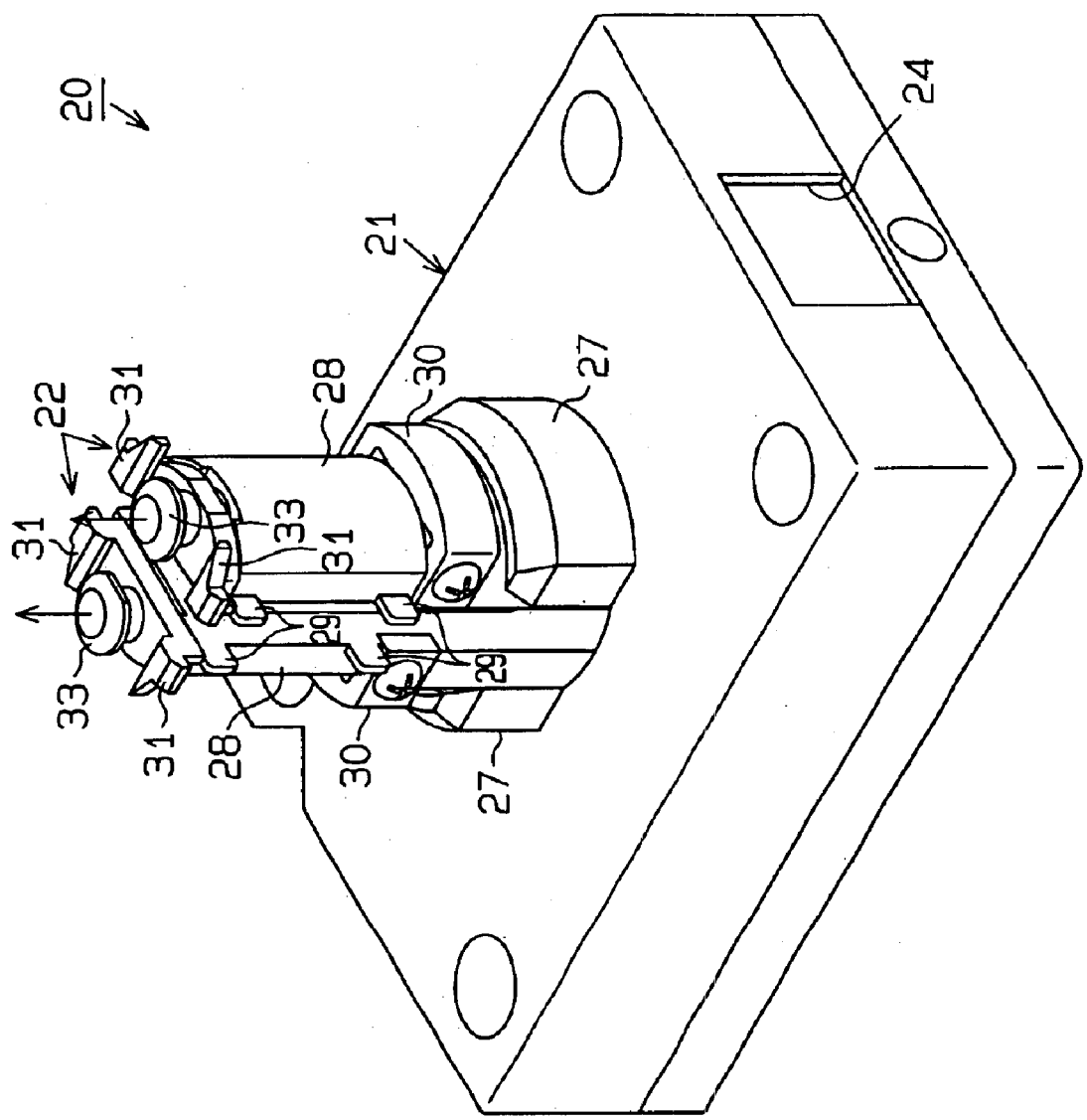
FIG. 6 is a perspective view showing a jig used for fixing magnets to a yoke housing.
Figure 7:
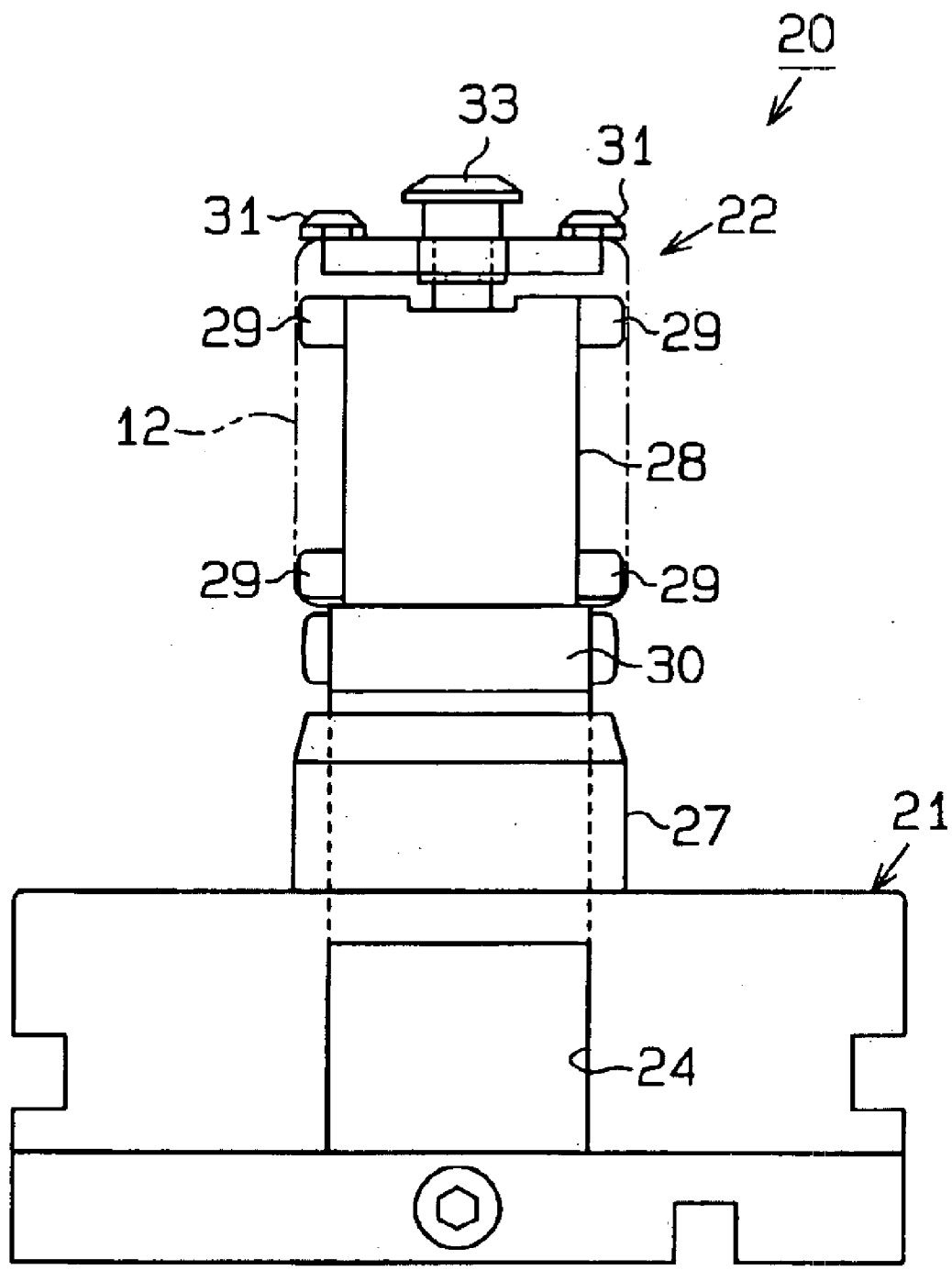
FIG. 7 is a side view showing the jig of FIG. 6.
Figure 8:
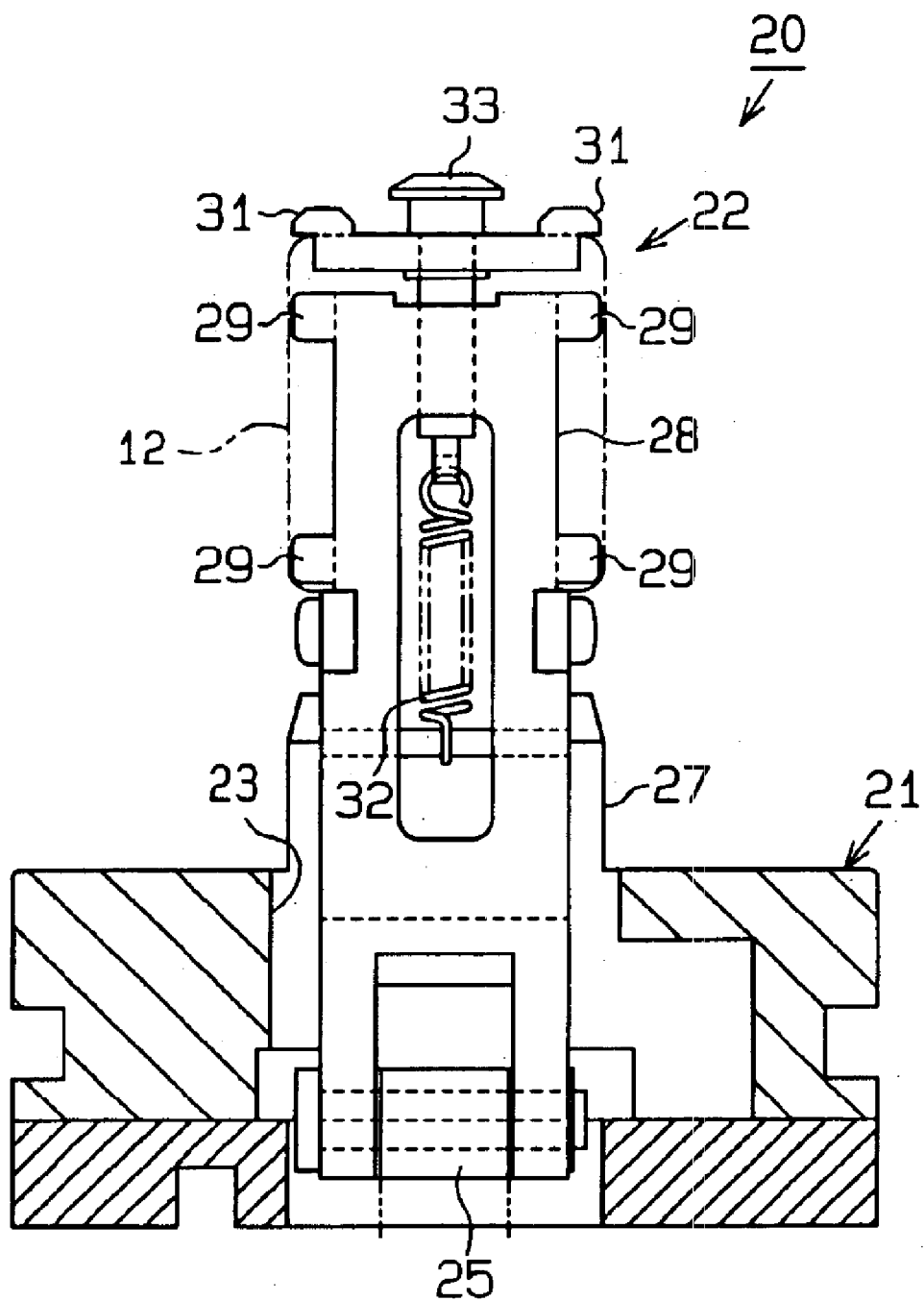
FIG. 8 is a cross-sectional side view showing the jig of FIG. 6.

In the first step S1, as shown in FIG. 5, a droplet of adhesive G is placed on the center of the outer surface 12a of each magnet 12. The adhesive is applied to the magnets 12 on a conveyer 51. In this embodiment, an acrylic resin two-component adhesive that sets at room temperature is used. The two-component adhesive has a main component and a setting agent, which are mixed when used.

Figure 4:
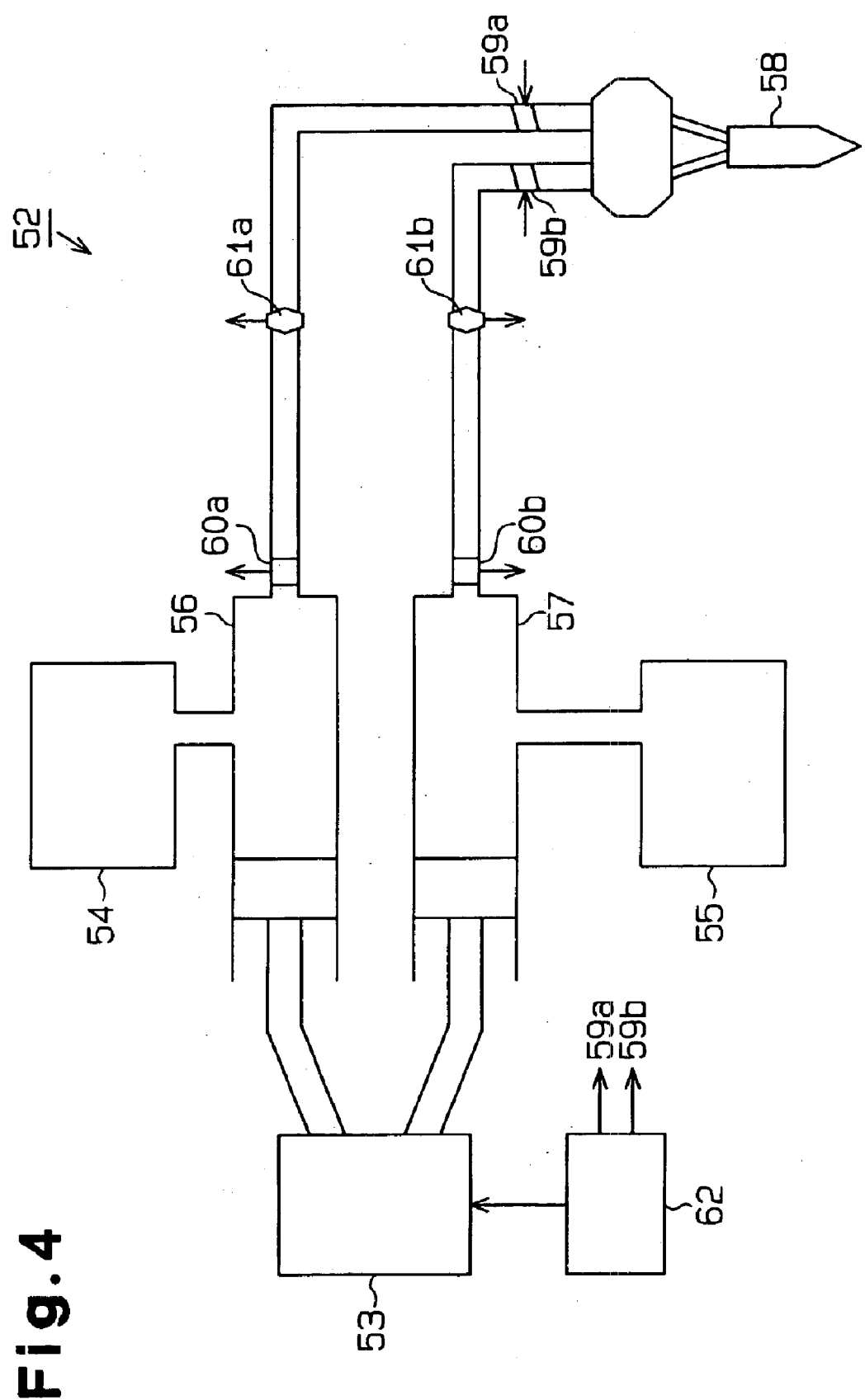
FIG. 4 is a diagram showing an adhesive application device used in a first step of the yoke manufacturing method.

When applying the adhesive, an adhesive application device 52 shown in FIG. 4 is used. The adhesive application device 52 includes a servomotor 53, a main component tank 54, a setting agent tank 55, a main component pump 56, a setting agent pump 57, a mixing nozzle 58, cut valves 59a, 59b, pressure sensors 60a, 60b, bubble sensors 61a, 61b, and a controller 62. The servomotor 53 actuates the main component pump 56 and the setting agent pump 57. The main component pump 56 sends main component stored in the main component tank 54 to the mixing nozzle 58. The setting agent pump 57 sends setting agent stored in the setting agent tank 55 to the mixing nozzle 58. The mixing nozzle 58 mixes the main component and the setting agent supplied from the main component tank 54 and the setting agent tank 55, and injects the adhesive, which is the mixture of the main component and the setting agent. The cut valves 59a, 59b instantaneously stop the injection from the mixing nozzle 58 such that the adhesive are applied to the magnets 12 in droplets. The pressure sensor 60a detects the pressure of the main component sent from the main component pump 56. The pressure sensor 60b detects the pressure of the setting agent sent from the setting agent pump 57. The bubble sensor 61a detects whether the main component send from the main component pump 56 contains bubbles. The bubble sensor 61b detects whether the setting agent sent from the setting agent pump 57 contains bubbles. The controller 62 controls the main component pump 56 and the setting agent pump 57 through the servomotor 53, and controls the opening of the cut valves 59a, 59b. Particularly, when the pressure sensors 60a, 60b detect an abnormality, or when the bubble sensors 61a, 61b detect bubbles, the controller 62 issues an alarm and stops the main component pump 56 and the setting agent pump 57.

(Second Step S2)

In the second step S2, the magnets 12 are carried to a predetermined position by the conveyer 51 and attached to the jig 20. Specifically, the knob 33 is moved upward to move the claws 31 to the disengage position. Then, a magnet 12 is attached to each receiving member 28. Thereafter, the knob 33 is released, which causes the claws 31 to be-moved to the engage position by the force of the tension spring 32. This operation of the knobs 33 is performed by an automatic device (not shown), and the magnets 12 are attached by a magnet set loader (not shown).

(Third Step S3)

Figure 11:
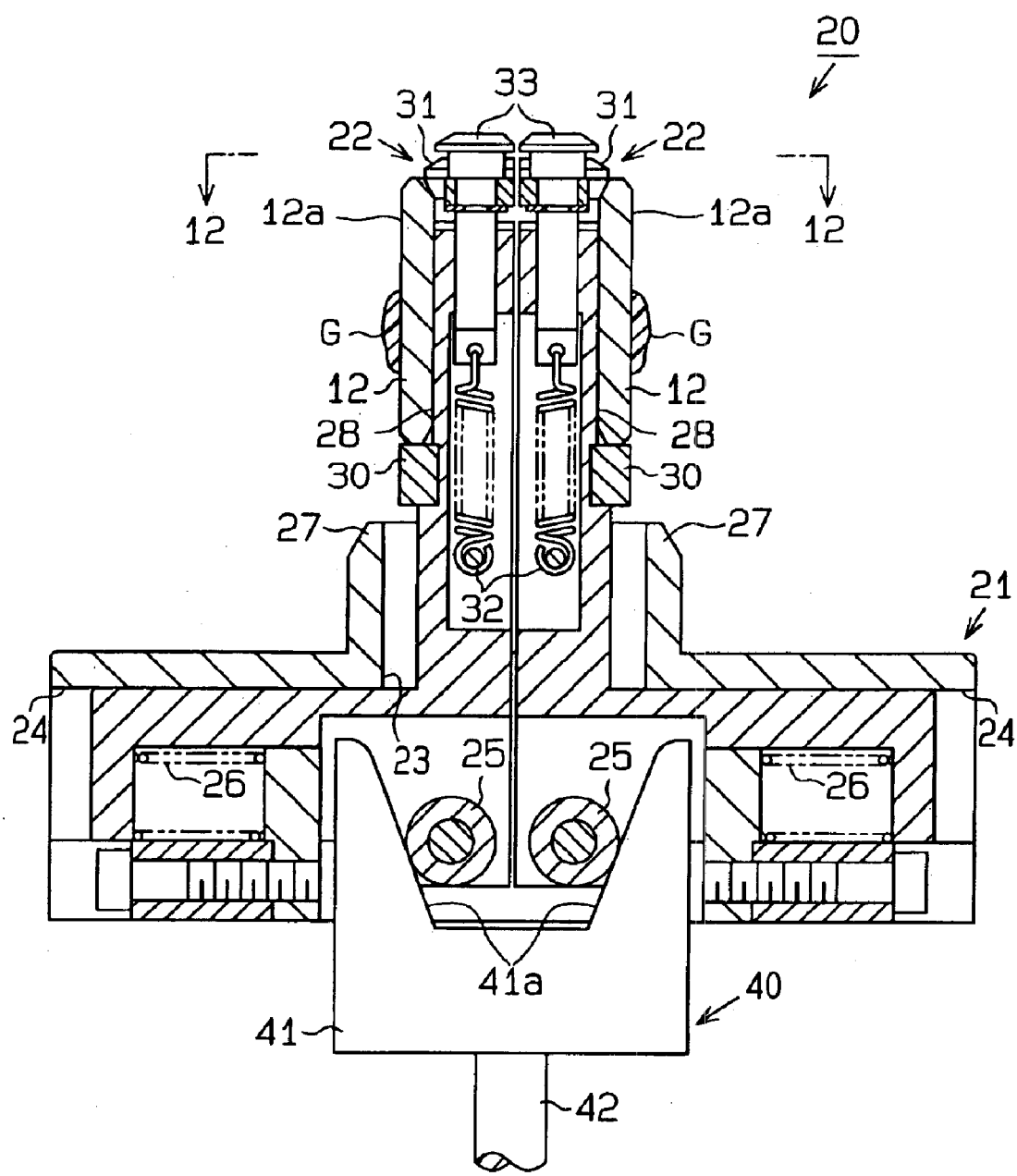
FIG. 11 is a cross-sectional front view showing the jig shown in FIG. 6 when magnets are attached thereto.
Figure 12:
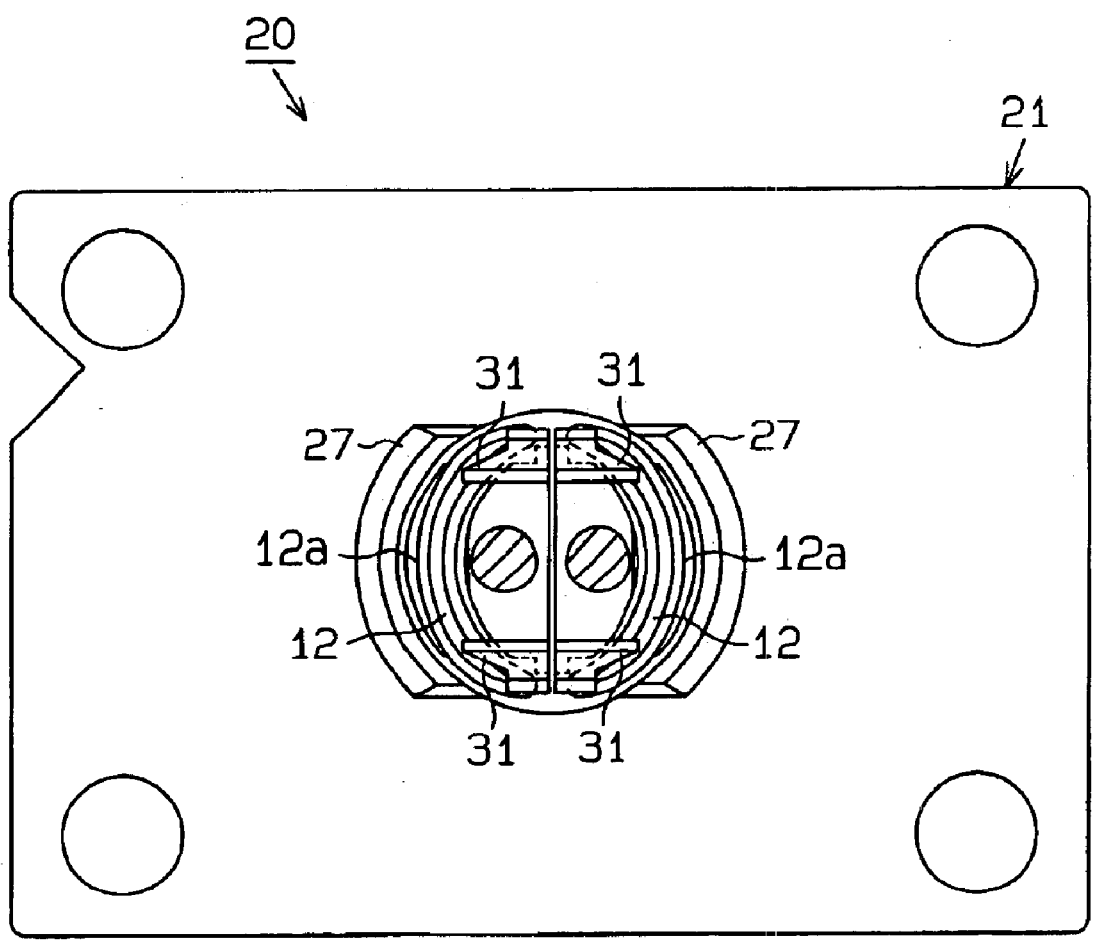
FIG. 12 is a cross-sectional view taken along line 12—12 in FIG. 11.
Figure 13:
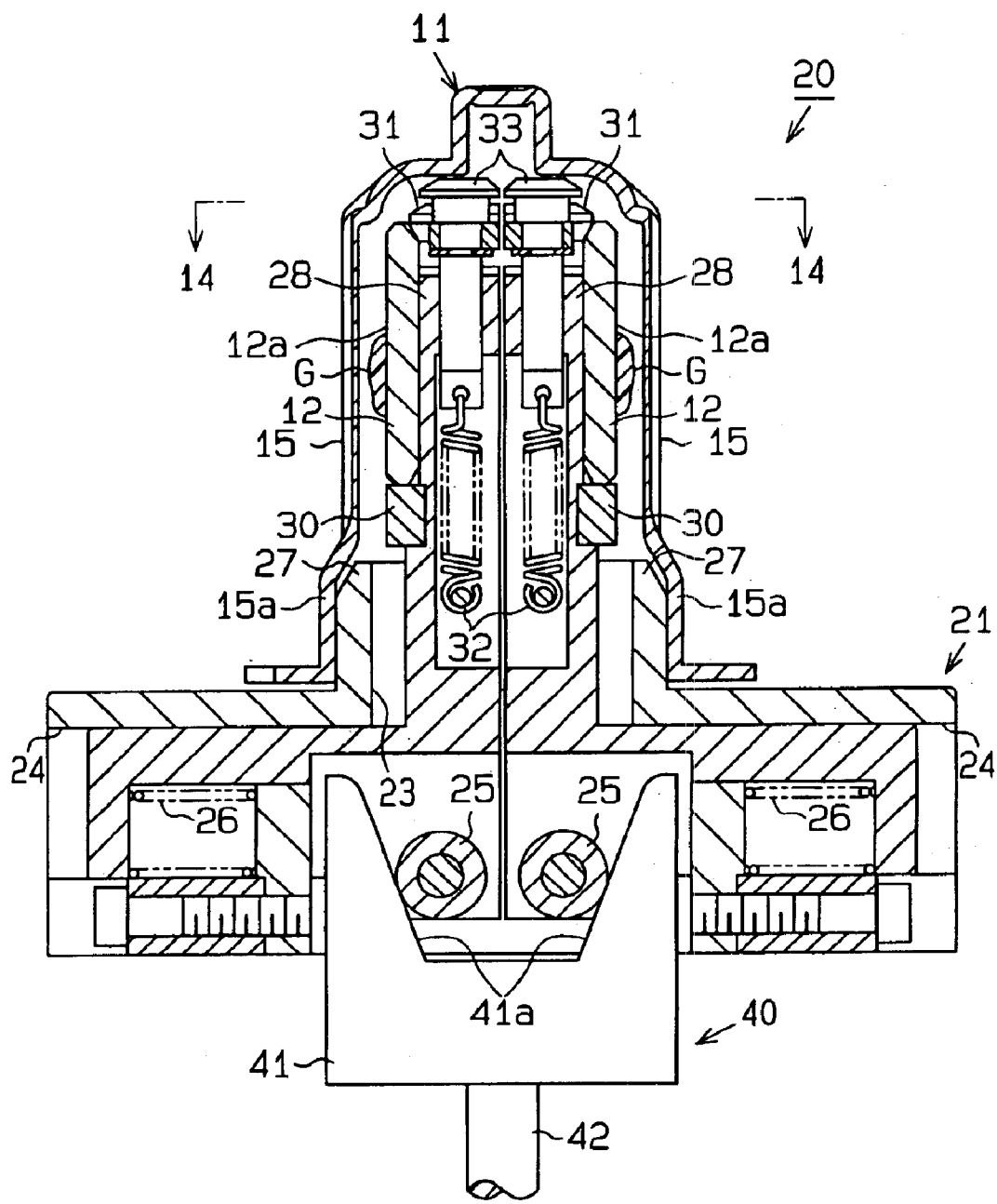
FIG. 13 is a cross-sectional front view showing the jig shown in FIG. 6 when magnets and a yoke housing are attached thereto.
Figure 14:
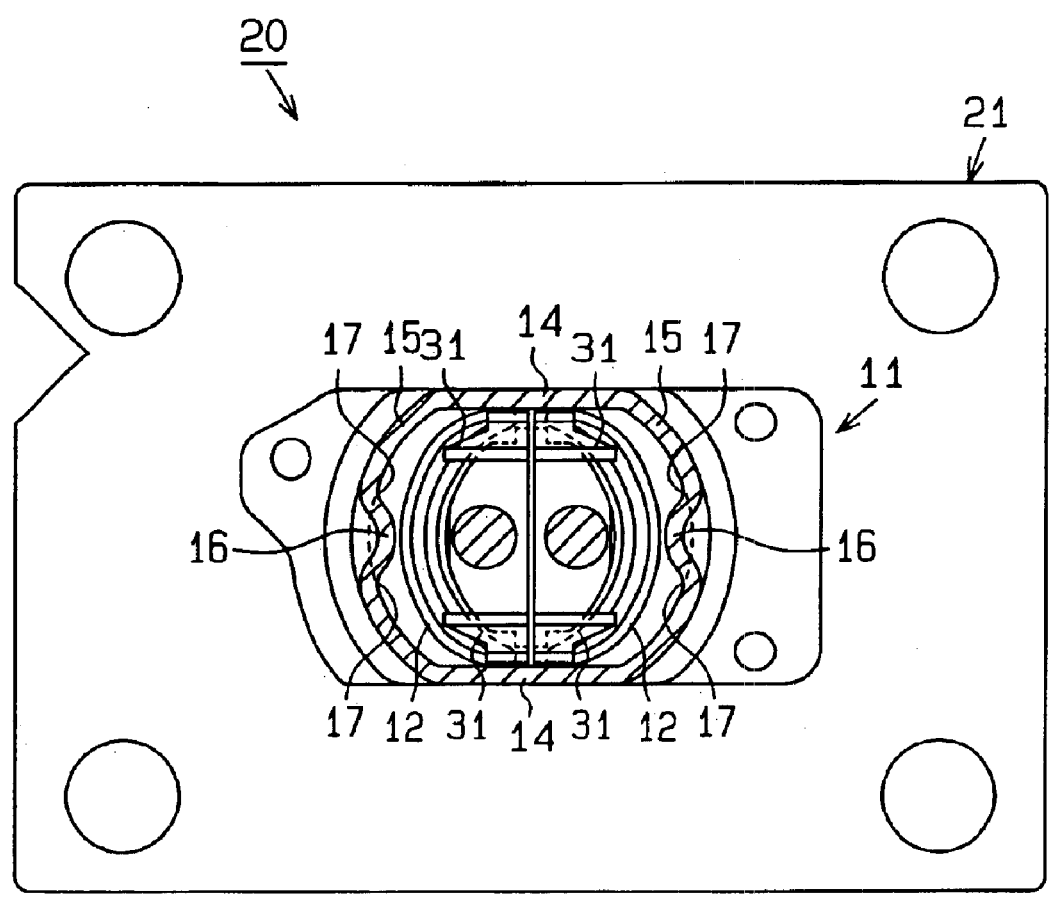
FIG. 14 is a cross-sectional view taken along line 14—14 in FIG. 13.

In the third step S3, the yoke housing 11 is attached to the jig 20 to which the magnets 12 are attached. Prior to attaching of the yoke housing 11, the moving members 22 are moved closest to each other as shown in FIGS. 11 and 12 by the actuator 40. Thereafter, as shown in FIGS. 13 and 14, the yoke housing 11 is placed over the jig 20 to cover the parts of the moving members 22 that protrude upward from the base 21, and the widened portions 15a are fitted about the stoppers 27. The yoke housing 11 is placed on the jig 20 by a yoke set loader (not shown)

(Fourth Step S4)

In the fourth step S4, the adhesive applied to the outer surface 12a of each magnet 12 is spread to the entire adhering areas of the yoke housing 11 and the magnet 12.

Figure 15:
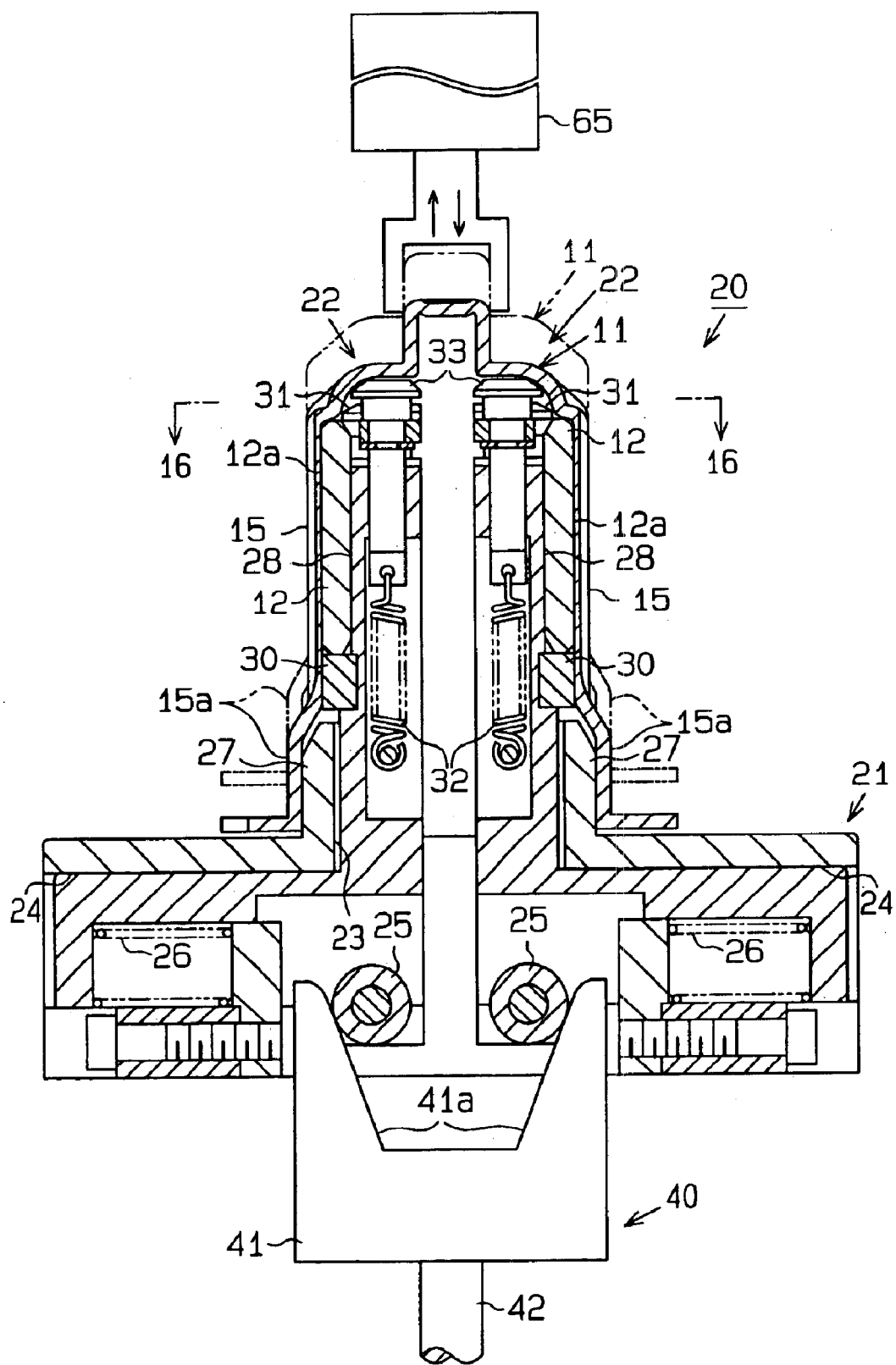
FIG. 15 is a cross-sectional front view showing the jig in a fourth step.
Figure 16:
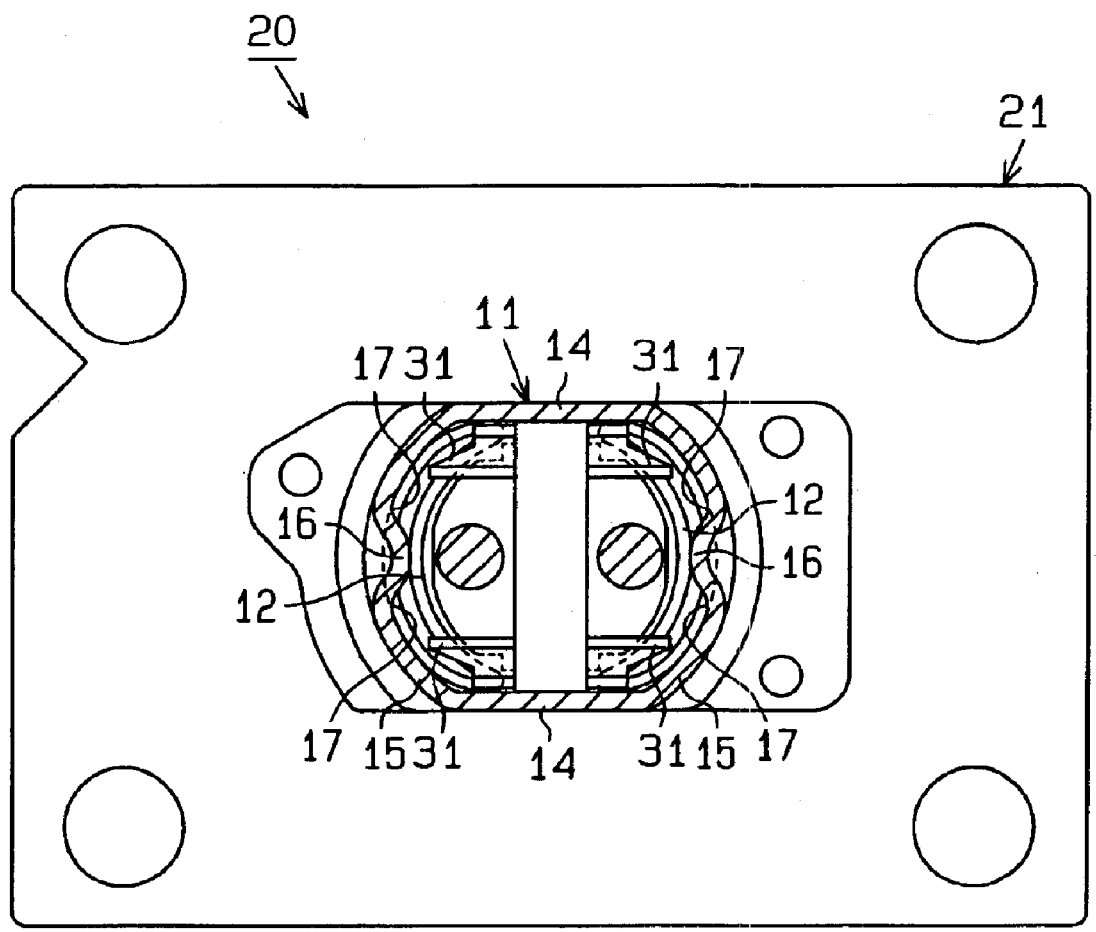
FIG. 16 is a cross-sectional view taken along line 16—16 in FIG. 15.
Figure 17A:
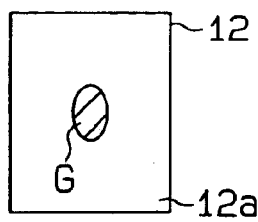
FIG. 17(a) is a front view showing a magnet to which adhesive is applied.
Figures 17B, 17C, 17D:
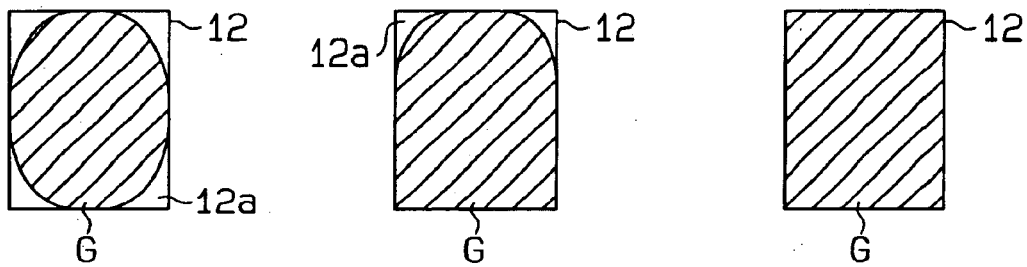
FIGS. 17(b) to 17(d) are diagrams showing states of adhesive in the adhering areas of a yoke housing and a magnet.

The moving members 22 are moved by the actuator 40 until the outer surfaces 12a of the magnets 12 contacts the inner surface of the yoke housing 11 as shown in FIGS. 15 and 16. The position of the operational member 41 of the actuator 40 corresponds to an intermediate position, which is between the highest position and the farthest position. Accordingly, the adhesive G in a droplet on the outer surface 12a of each magnet 12 (see FIG. 17(a)) is widely spread in the adhering areas of the yoke housing 11 and the magnet 12 as shown in FIG. 17(b). Next, as shown in FIG. 15, the yoke housing 11 is vertically reciprocated by an automatic sliding device 65 so that the adhering areas of the yoke housing 11 and the magnets 12 slide on each other. When the yoke housing 11 is moved upward, the adhesive G is spread to the sides of the lower portion of the adhering areas of the yoke housing 11 and the magnet 12 as shown in FIG. 17(c). When the yoke housing 11 is moved downward, the adhesive is spread to the sides of the upper portion of the adhering areas of the yoke housing 11 and the magnet 12 as shown in FIG. 17(d). When the yoke housing 11 is moved downward, the circumferential center of the upper end of each magnet 12 caused to hit the corresponding projection 16. Accordingly, the vertical position of the magnet 12 is determined. At this time, the distal ends of the claws 31 retreat the recesses 17 on the sides of the projections 16 (see FIG. 16). Finally, the operational member 41 of the actuator 40 is moved to the lowest position so that the outer surface 12a of each magnet 12 is pressed against the inner surface of the yoke housing 11 by the corresponding compression spring 26.

Figure 18:
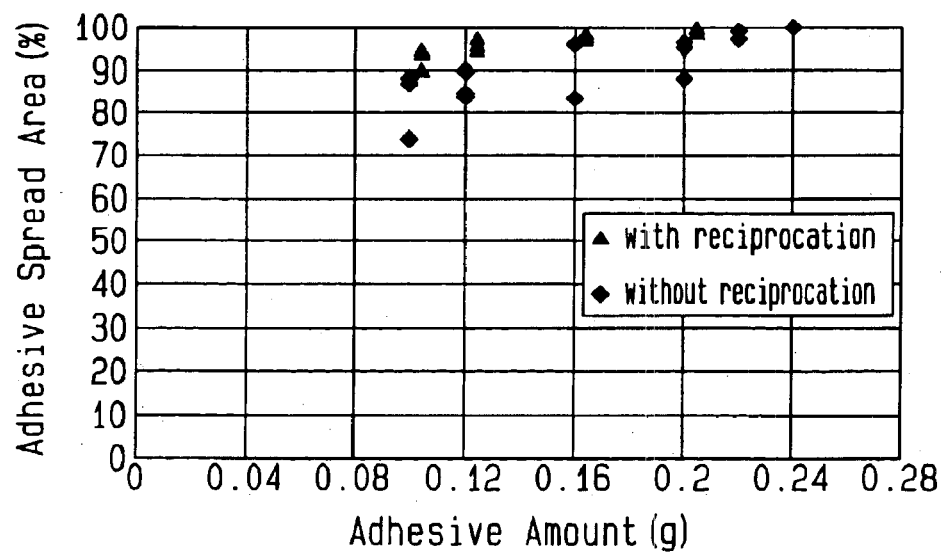
FIG. 18 is a graph showing the relationship between the amount of applied adhesive and the area in which the adhesive is spread.

The graph of FIG. 18 shows the results of an experiment. Specifically, the graph shows the relationship between the amount of adhesive applied to the magnets 12 and the spreading area of the adhesive in cases where the yoke housing 11 is vertically reciprocated and in cases where the yoke housing 11 is not vertically reciprocated. As obvious from the graph, even if the amount of applied adhesive is small, vertical reciprocation of the yoke housing 11 will spread the adhesive in a wide area in the adhering area between the yoke housing 11 and the magnet 12.

(Fifth Step S5)

In the fifth step S5, the adhesive is cured at room temperature. The fifth step S5 is performed while the jig 20 is being transferred from a location where the fourth step S4 has been performed to a location where the sixth step will be performed. Through the fifth step S5, the magnets 12 are fixed to the inner surface of the yoke housing 11 and the yoke 10 is obtained.

(Sixth Step S6)

Figure 19:
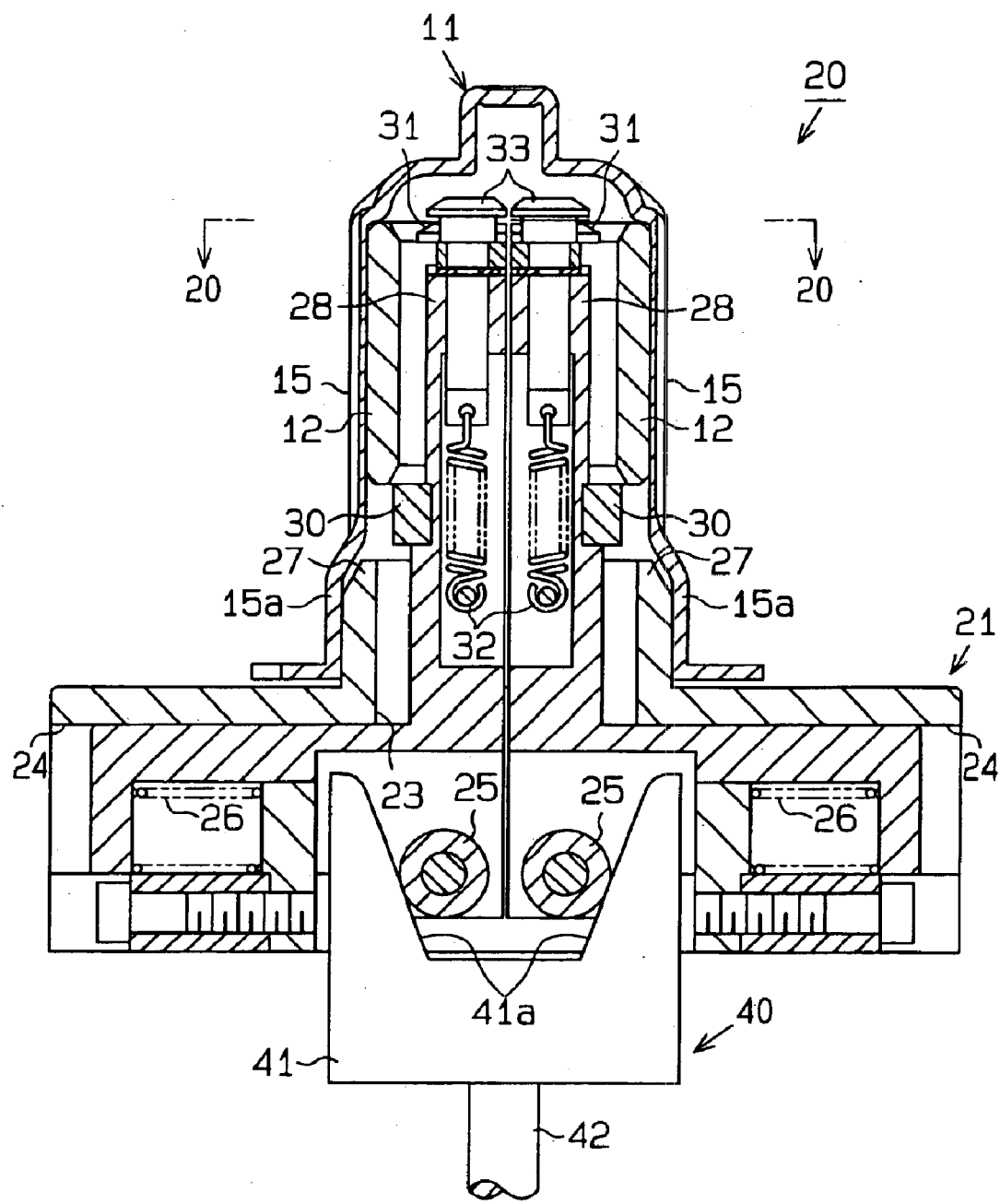
FIG. 19 is a cross-sectional front view showing the jig in a sixth step.
Figure 20:
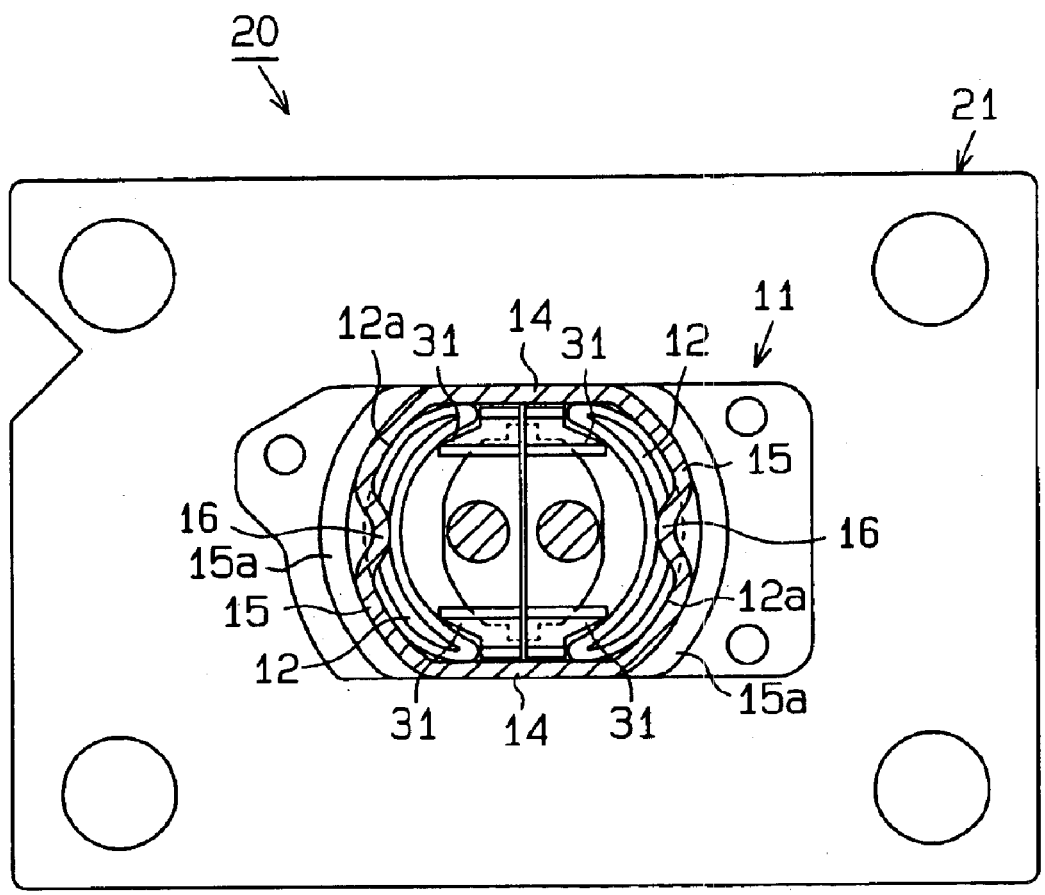
FIG. 20 is a cross-sectional view taken along line 20—20 in FIG. 19.
Figure 23:
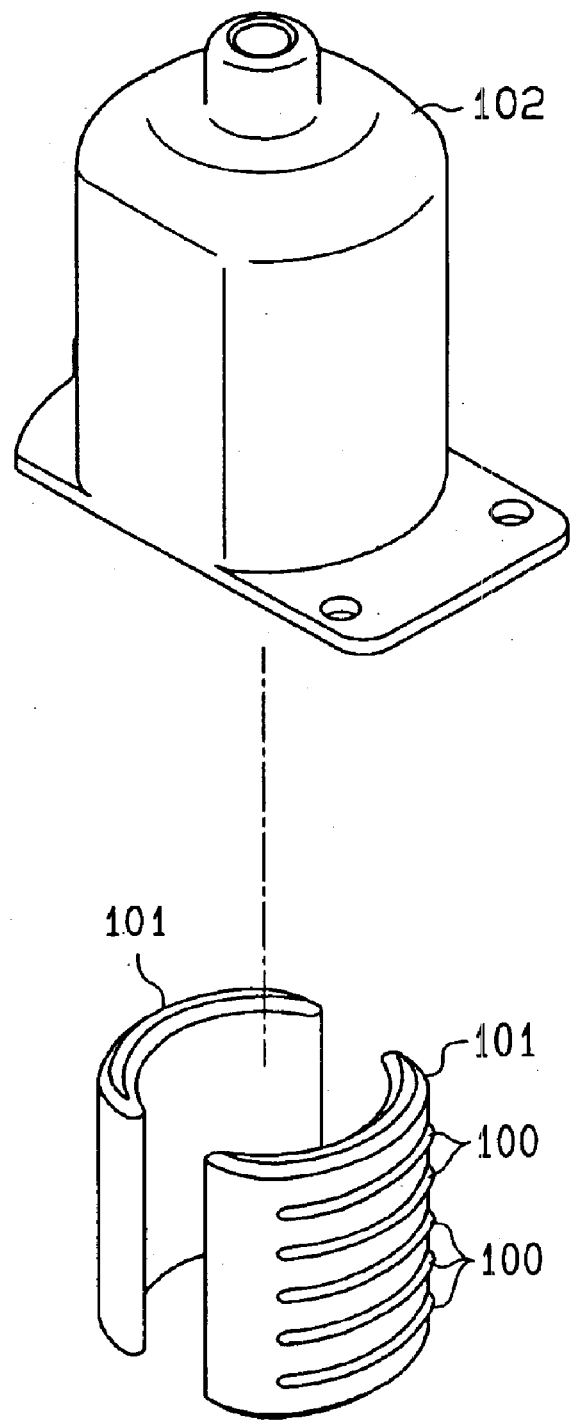
FIG. 23 is an exploded perspective view illustrating a prior art method for manufacturing a yoke.

In the sixth step S6, the yoke 10, which has been obtained in the fifth step S5, is removed from the jig 20. Prior to removal of the yoke 10, the moving members 22 are moved closest to each other by the actuator 40 as shown in FIGS. 19 and 20. Since the force by which the receiving members 28 hold the magnet 12 is sufficiently smaller than the adhesive strength between the inner surface of the yoke housing 11 and the magnets 12, the receiving members 28 automatically separate from the magnets 12 as the moving members 22 are moved closer to each other. The yoke 10 is removed from the jig 20 by an automatic device (not shown) As shown in FIG. 1, the location where the sixth step S6 is performed is adjacent to the location where the second step S2 is performed. After being removed from the jig 20, the yoke 10 is transferred to the subsequent steps. The jig 20 is circulated back to the location of the second step.

The present embodiment has the following advantages.

The adhering areas of the yoke housing 11 and the magnets 12 are caused to slide on each other so that the adhesive is spread to the entire adhering areas. Therefore, even if the amount of the adhesive is relatively small, the magnets 12 are reliably fixed to the yoke housing 11. If the amount of the adhesive is decreased, the time required for applying the adhesive is shortened. Therefore, poor adhesion of the magnets 12 to the yoke housing 11 due to undesirable curing of the adhesive while the adhesive being applied is prevented. Also, the material costs are reduced.

The yoke housing 11 and the magnets 12 are caused to slide on each other by vertically reciprocating the yoke housing 11. In other words, both of the two sets of the adhering areas of the yoke housing 11 and the magnets 12 are caused to slide on each other at the same time. The adhering areas of each magnet 12 and the yoke housing 11 need not be caused to slide on each other consecutively.

Before being applied to the magnets 12, the main component and the setting agent of the adhesive are mixed. This facilitates uniform mixture of the main component and the setting agent.

When attached to the corresponding receiving member 28, each magnet 12 is engaged with the engaging pieces 29, the stopping members 30, and the claws 31. Therefore, during the manufacture of the yoke 10, the magnets 12 are prevented from displaced on or falling off the receiving members 28.

When attaching the yoke housing 11 to the jig 20, the moving members 22 are caused to be closest to each other in advance. Therefore, when attaching the yoke housing 11 to the jig 20, the adhesive on each magnet 12 is prevented from being squeezed out of the adhering areas on the yoke housing 11.

When curing the adhesive, the magnets 12 are pressed against the yoke housing 11 by the force of the compression springs 26. This causes the magnets 12 to intimately contact the inner surface of the yoke housing 11. If the magnets 12 are fixed to the yoke housing 11 with spaces in between, the magnets 12 can prevent rotation of a rotor if the yoke 10 is used in a direct-current motor. In this embodiment, since the magnets 12 are caused to closely contact the inner surface of the yoke housing 11, such drawbacks are eliminated.

When the yoke housing 11 and the magnets 12 are caused to slide on each other at the adhering areas, the operational member 41 of the actuator 40 is moved to the intermediate position between the highest position and the lowest position. At this time, although the magnets 12 hit the inner surface of the yoke housing 11, the force of the compression springs 26 that presses the magnet 12 against the inner surface of the yoke housing 11 is weak as compared with a case in which the operational member 41 is moved to the highest position. Therefore, the yoke housing 11 is easily moved in the vertical direction.

The claws 31 engage with the circumferential ends of the upper end of each magnet 12. Therefore, when the circumferential center of the upper end of each magnet 12 hits the corresponding projection 16, the claws 31 retreat to the recesses 17 on the sides of the projection 16. Therefore, the claws 31 do not interfere with the projections 16, and the circumferential center of the upper ends of the magnets 12 reliably hit the projections 16. This permits the magnets 12 to be reliably fixed to the predetermined positions on the inner surface of the yoke housing 11.

It should be apparent to those skilled in the art that the present invention may be embodied in many other specific forms without departing from the spirit or scope of the invention. Particularly, it should be understood that the invention may be embodied in the following forms.

The adhesive for fixing the magnet 12 to the yoke housing 11 does not need to be an acrylic resin. For example, the adhesive may be an epoxy resin two-component adhesive that sets at room temperature. Alternatively, a one-component adhesive that sets at room temperature may be used. Further, instead of a room temperature setting adhesive, a thermosetting adhesive may be used.

In the illustrated embodiment, the adhesive is applied to the magnets 12. However, as shown in FIGS. 21(b) and 21(c), the adhesive G may also be applied to the yoke housing 11. Alternatively, the adhesive may be applied only to the yoke housing 11.

The main component and the setting agent may be separately applied to the yoke housing 11 or to the magnets 12. For example, as shown in FIG. 21(a), main component 70 and setting agent 71 may be applied to the outer surface 12a of each magnet 12 in stripes. In this case, the main component and the setting agent are mixed by causing the yoke housing 11 and the magnet 12 to slide on each other. This embodiment prevents the adhesive from being cured from when the adhesive is applied to when the magnets 12 are attached to the yoke housing 11. Also, since the main component and the setting agent need not be mixed in advance, no mixing nozzle is required. Therefore, an adhesive application device having a simple structure can be used. FIG. 22 shows an adhesive application device 80 that separately inject a main component and a setting agent. The adhesive application device 80 of FIG. 22 includes a main component tank 81, a setting agent tank 82, a main component nozzle 83, which injects the main component sent from the main component tank 81, and a setting agent nozzle 84, which inject the setting agent sent from the setting agent tank 82.

The automatic sliding device 65 may be replaced with the yoke set loader used in the third step S4.

In the illustrated embodiment, the actuator 40 is used only in the third step S3 and the fourth step S4, and is not required in the other steps. Therefore, when consecutively manufacturing the yokes 10 with a plurality of the jigs 20, some of the jigs 20 need not have the actuator 40.

In the illustrated embodiment, one projection 16 is formed to correspond to each magnet 12. However, two or more projections 16 may be formed to correspond to each magnet 12.

Two projections 16 and a claw 31 may be provided for each magnet 12. In this case, the projections 16 are formed to correspond to the circumferential ends of the corresponding arcuate portion 15 at the boundary between the bottom portion 13 and the arcuate portion 15. The claw 31 is provided to engage with the circumferential center of the upper end of the magnet 12 attached to the corresponding receiving member 28.

The yoke housing 11 and the magnets 12 may be caused to slide on each other by rotating the yoke housing 11. Alternatively, the yoke housing 11 and the magnets 12 may be caused to slide on each other by moving the magnets 12 relative to the yoke housing 11.

The projections 16 do not need to be formed at the boundary of the bottom portion 13 and the arcuate portions 15. However, the projections 16 may be formed on the bottom portion 13 or on the arcuate portions 15. Alternatively, the projections 16 may be formed on the flat portions 14. The recesses 17 do not need to be formed at the boundary of the bottom portion 13 and the arcuate portions 15. However, the recesses 17 may be formed on the bottom portion 13 or on the arcuate portions 15. Alternatively, the recesses 17 may be formed on the flat portions 14.

Therefore, the present examples and embodiments are to be considered as illustrative and not restrictive and the invention is not to be limited to the details given herein, but may be modified within the scope and equivalence of the appended claims.

What is claimed is:

1. A method for manufacturing a yoke used in an electric rotating machine, wherein the yoke includes a yoke member and a magnet that is fixed to the yoke member with adhesive, the method comprising:

applying adhesive at least to an adhering area of the yoke member that is to be adhered to the magnet or to an adhering area of the magnet that is to be adhered to the yoke member; and spreading the adhesive to the adhering areas of the yoke member and the magnet by vertically reciprocating one of the yoke member and the magnet relative to the other so that the adhering areas slide on each other.

2. A method for manufacturing a yoke used in an electric rotating machine, wherein the yoke includes a cylindrical yoke member having a closed end and a magnet that is located in the yoke member and is fixed to the yoke member with adhesive, the method comprising:

applying adhesive at least to an adhering area of the yoke member that is to be adhered to the magnet or to an adhering area of the magnet that is to be adhered to the yoke member;

attaching the magnet to a jig;

covering the magnet attached to the jig with the yoke member; and spreading the adhesive to the adhering areas of the yoke member and the magnet by vertically reciprocating one of the yoke member and the magnet relative to the other so that the adhering areas slide on each other.

3. The method according to claim 2, wherein the adhesive includes a main component and a setting agent that are mixed when used, wherein the main component and the setting agent are mixed prior to applying the adhesive at least to the adhering area of the yoke member or to the adhering area of the magnet.

4. The method according to claim 2, wherein the adhesive includes a main component and a setting agent that are mixed when used, wherein, after separately being applied at least to the adhering area of the yoke member or to the adhering area of the magnet, the main component and the setting agent are mixed with each other in the adhering areas by moving one of the yoke member and the magnet relative to the other.

5. The method according to claim 2, wherein the magnet is one of a pair of magnets, and wherein the magnets are held by the jig such that the magnets face each other with the jig in between.

6. The method according to claim 5, wherein, before one of the yoke member and the magnets is moved relative to the other, the magnets are moved in a radial direction of the yoke from positions at which the magnets are close to each other to positions at which the magnets are spaced from each other, whereby the adhering area of each magnet contacts the adhering area of the yoke member.

7. A method for manufacturing a yoke used in an electric rotating machine, wherein the yoke includes a cylindrical yoke member having a closed end and a magnet that is located in the yoke member and is fixed to the yoke member, the method comprising:

forming a projection and a retreat portion in the yoke member:

covering the magnet with the yoke member while holding the magnet with a holding member; and fixing the magnet to the yoke member with adhesive while causing the magnet held by the holding member to contact the projection, wherein, when the magnet contacts the projection, the holding member is located in the retreat portion.

8. The method according to claim 7, wherein the retreat portion is one of a plurality of retreat portions that are located on both sides of the projection.

9. The method according to claim 7, wherein the projection is one of a plurality of projections that are located on both sides of the retreat portion.

10. A method for manufacturing a yoke used in an electric rotating machine, wherein the yoke includes a cylindrical yoke member having a closed end and a magnet that is located in the yoke member and is fixed to the yoke member with adhesive, the method comprising;
 forming a projection and a retreat portion in the yoke member;
 attaching the magnet to the jig, wherein the jig holds the magnet with a holding member in the axial direction;
 sliding the yoke member and the magnet on each other while pressing the magnet held by the holding member against the inner surface of the yoke member with the adhesive in between;
 determining the position of the magnet held by the holding member by causing the magnet to contact the projection, wherein, when the magnet contacts the projection, the holding member is located in the retreat portion; and
 releasing the magnet from the holding member after the adhesive is cured.

11. A method for manufacturing a yoke used in an electric rotating machine, wherein the yoke includes a cylindrical yoke member having a closed end, and a pair of magnets that are located in the yoke member and are fixed to the yoke member with adhesive, the method comprising:
 applying adhesive at least to an adhering area of the yoke member that is to be adhered to the magnets or to an adhering area of the magnets that is to be adhered to the yoke member;
 attaching the magnets to a jig;
 moving the magnets in positions at which the magnets are close to each other;
 covering the magnets, which are attached to the jig, with the yoke member;
 moving the magnets in a radial direction of the yoke from the positions at which the magnets are close to each other to positions at which the magnets are spaced from each other, whereby the adhering area of each magnet contacts the adhering area of the yoke member; and
 vertically reciprocating one of the yoke member and the magnets relative to the other so that the adhering areas of the yoke member and the magnets slide on each other.

12. The method according to claim 11, the method further comprising:
 moving the magnets in a radial direction of the yoke from the positions at which the magnets are spaced from each other to positions at which the magnets are spaced farther from each other after the vertical reciprocation, so that the outer surface of each magnet is pressed against the inner surface of the yoke member.

* * * * *